D. S. KENNEDY.
RESILIENT TIRE.
APPLICATION FILED DEC. 31, 1919.

1,355,748.

Patented Oct. 12, 1920.
2 SHEETS—SHEET 1.

WITNESSES

INVENTOR
DONALD STEWART KENNEDY.
BY
ATTORNEYS

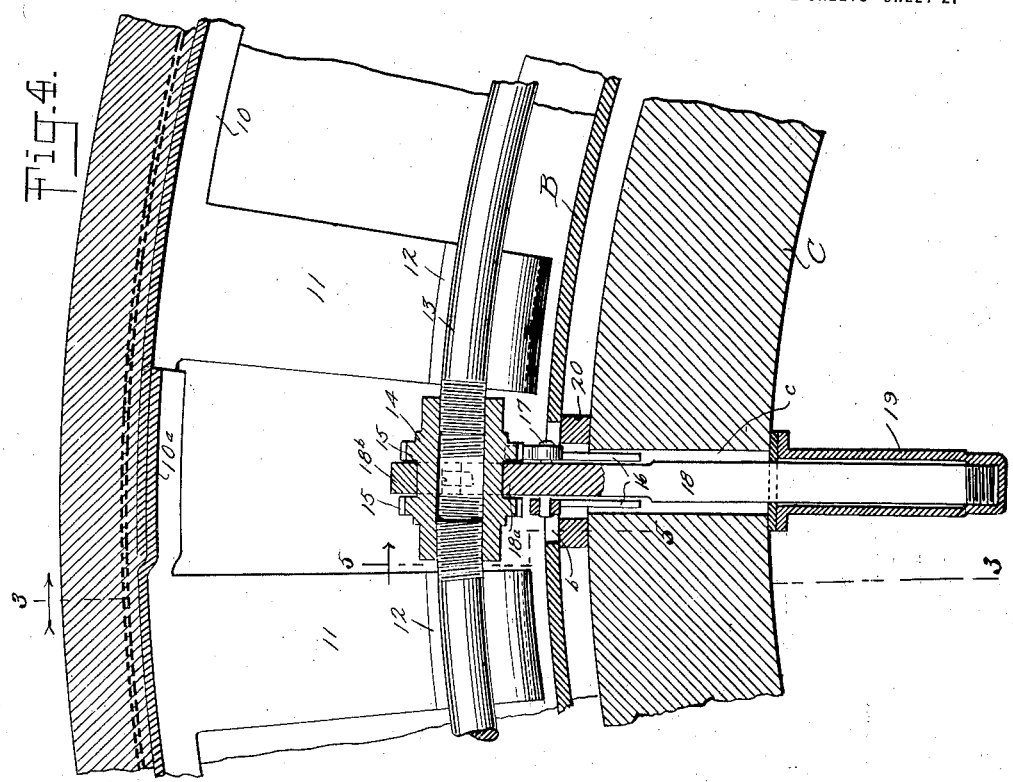
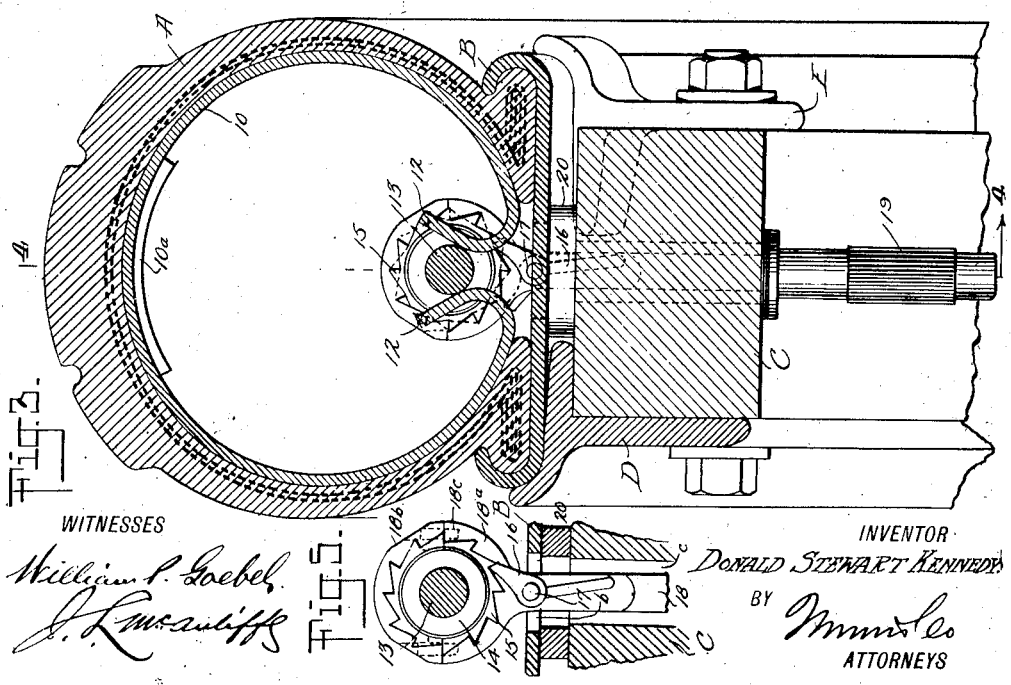

UNITED STATES PATENT OFFICE.

DONALD STEWART KENNEDY, OF NEW YORK, N. Y.

RESILIENT TIRE.

1,355,748.  Specification of Letters Patent.  Patented Oct. 12, 1920.

Application filed December 31, 1919. Serial No. 348,505.

*To all whom it may concern:*

Be it known that I, DONALD STEWART KENNEDY, a citizen of the United States, and a resident of the city of New York, borough of the Bronx, in the county of Bronx and State of New York, have invented a new and Improved Resilient Tire, of which the following is a description.

My invention relates to spring means to be employed within a tire tube or casing in substitute of the pneumatic inner tube.

The general object of the invention is to provide a resilient element to be placed in the tire shoe and extend about the same, together with improved means for expanding said element firmly against the tire at the sides as well as the tread or for relaxing the tension of said spring element for its insertion or removal.

Reference is to be had to the accompanying drawings, forming a part of this specification, it being understood that the drawings are merely illustrative of one example of the invention.

Fig. 3 is an enlarged cross section through the tire and wheel rim on the line 3—3 of Fig. 4;

Fig. 4 is a section on the line 4—4, Fig. 3;

Fig. 5 is a cross sectional view given to show the means employed in the present example for contracting or expanding the band controlling the resilient element.

Figure 1:
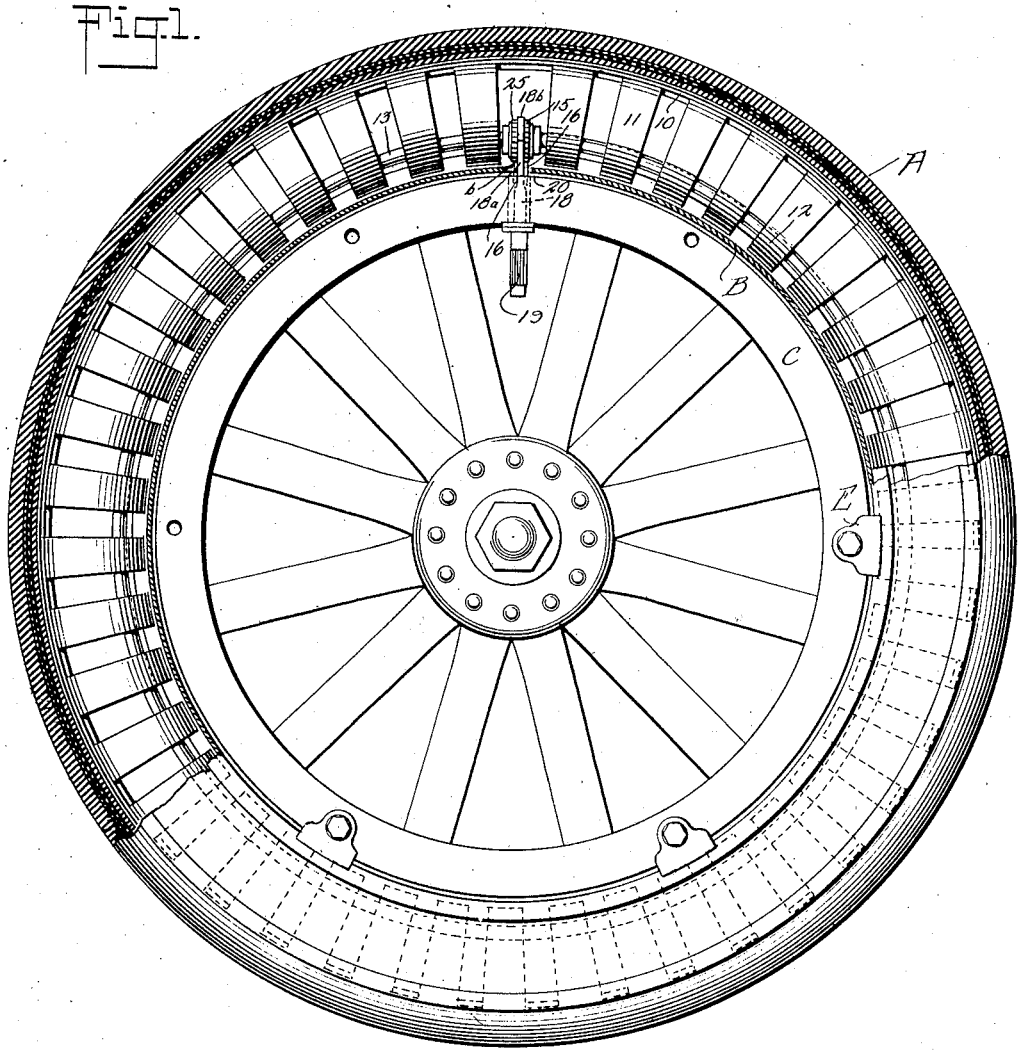
Figure 1 is a partly sectional side elevation of a wheel having a tire embodying my invention.
Figure 2:
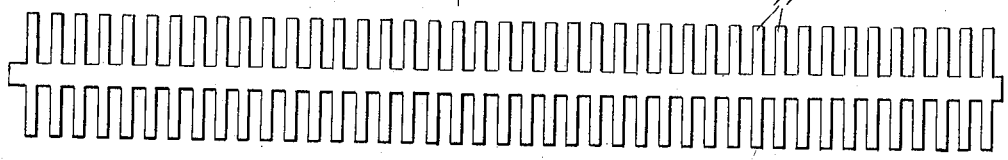
Fig. 2 is a plan view on a reduced scale, of the blank of which the resilient element is formed.

In carrying out my invention in accordance with the illustrated example, a resilient element 10 is provided, of a length that when curved it may extend entirely within the tire shoe A. One terminal 10ª of the element 10 is offset radially inward to overlap the adjacent end. Said element 10 is formed along both sides with curved fingers 11 adapted to conform to the curvature of the side of the shoe A at the interior and to approach each other between the edges of the shoe. The terminals 12 of the fingers 11 are curved radially outward and then deflected laterally to flare with respect to each other and present opposed inclined surfaces.

A ring or split band 13 extends within the element 10 adjacent to the demountable rim B between the opposed flaring terminals 12 and is adapted to exert pressure on the latter. The preferred means for connecting the ends of the band 13 and causing the expansion and contraction thereof comprises a turn-buckle 14 which connects the right and left threaded ends of said band and said turnbuckle is provided with spaced right and left ratchets 15 engaged by corresponding handled pawls 16 which are pivoted as at 17 on a ratchet lever 18 swiveled onto the turnbuckle between said ratchets. The head 18ª of the lever 18 has the outer half 18ᵇ thereof separate and secured by screws 18ᶜ or the like, so that the part 18ᵇ may be removed for securing or detaching the ratchet lever.

In practice, the element 10 is placed in the shoe A and the split band 13 is inserted within said element to lie between the terminals 12. When the split band 13 is placed in position the threads thereon at the ends are merely started into the internal threads of the turnbuckle 14, and while in this condition the shoe A with the element 10 is placed on the demountable rim B with the ratchet lever 18 projecting radially inward through the hole *b* in said rim. The element 10 is then expanded to any desired extent by the action of the ratchet lever 18 and the turnbuckle 14, after which the demountable rim with the tire shoe, element 10, and split band 13 is placed in position on the felly C, and secured in any suitable manner, there being shown a beaded ring D at one side of known form and lugs E at the opposite side.

In the placing of the tire and the demountable rim on the wheel, the ratchet lever 18 is caused to pass radially inward through the hole *c* provided in the felly C for the ordinary tire valve and advantageously, I provide a cap 19 similar to that of valve to incase and conceal the outer end of the lever 18 and close said hole *c*. The cap is shown as internally threaded near the outer end to engage external threads on lever 18 and a washer is shown between the outer end of said cap and the felly. When the demountable rim is removed, the hole *b* affords clearance for the movements of the ratchet lever 18 in actuating the turnbuckle 14 for expanding the band 13 and relieving the pressure on the element 10. If desired in practice a washer 20 may be placed about the lever 18 between the demountable rim B and the felly to effect a tight closure of the hole *b*.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim:

1. The combination with a wheel and its felly of a tire thereon including a casing, an annular tubular resilient element extending about the interior of said casing and presenting a central continuous tread member, and fingers integral with said member at opposite sides of the same, said integral fingers at their inner ends being inturned laterally toward each other, the terminals of the fingers extending in the general direction of the tread of the tire and being deflected laterally outward to flare relatively to the medial plane of the tire; together with means engaging said terminals, and means extending radially inward from said first means through said felly to the inner side of the latter for actuating the first means.

2. A tire including a casing, an annular tubular resilient element extending about the interior of said casing and presenting a central continuous tread member, and fingers integral with said member at opposite sides of the same, said integral fingers at their inner ends being inturned laterally toward each other, the terminals of the fingers extending in the general direction of the tread of the tire and being deflected laterally outward to flare relatively to the medial plane of the tire; together with the split band extending within the tire and engaging all of said terminals, means connecting the ends of said split band and adapted to expand the same, and means to operate the first means and operative from the exterior of the tire.

3. In a resilient tire, a tubular resilient element adapted to be placed within a tire shoe and presenting resilient fingers at opposite sides thereof, said fingers being curved laterally inward toward each other and terminating in members disposed in the general direction of the tread portion of said element and flaring relatively to the medial plane of said element, a split band accommodated between the flaring terminals of the fingers, said split band having right and left threads on the respective ends thereof, a turnbuckle engaging said threads, and connecting said ends, right and left ratchets on said turnbuckle, a ratchet lever loose on said turnbuckle between said ratchets, and oppositely disposed pawls pivotally mounted on said ratchet lever and adapted to be engaged with said ratchets.

DONALD STEWART KENNEDY.